Figure 1:
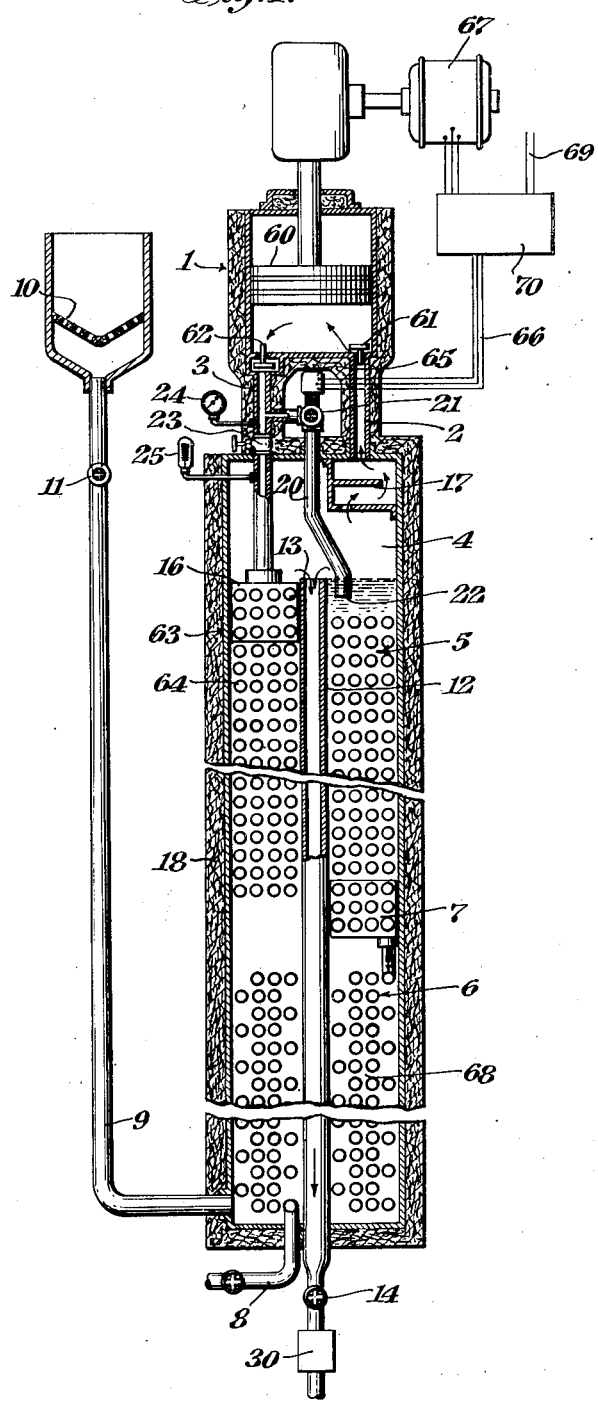

Jan. 2, 1940.   R. V. KLEINSCHMIDT   2,185,596
METHOD OF AND APPARATUS FOR DISTILLATION
Filed Oct. 12, 1938

INVENTOR
Robert. V. Kleinschmidt
BY
Kenyon & Kenyon
ATTORNEYS

Patented Jan. 2, 1940

2,185,596

UNITED STATES PATENT OFFICE 2,185,596

METHOD OF AND APPARATUS FOR DISTILLATION

Robert V. Kleinschmidt, Stoneham, Mass., assignor to Arthur D. Little, Incorporated, Cambridge, Mass., a corporation of Massachusetts Application October 12, 1938, Serial No. 234,523

8 Claims. (Cl. 202—75)

This invention relates to improvements in process and apparatus for separating components of a fluid mixture of two or more substances by reason of their difference in boiling point or volatility. More particularly, my process and apparatus are applicable to those cases where both the initial mixture and the separated components are liquids during some portion of the process, but these liquids may be more or less concentrated solutions of solids, liquids, or gases in liquids, or liquid mixtures of materials normally in the solid or gaseous form in the pure state. My process and apparatus relate generally to what is commonly referred to as distillation, fractionation, rectification, evaporation, concentration and the like, which are characterized by the evaporation of a portion of a liquid mixture. Any such liquid mixture is referred to herein as a "solution" and any such operation is referred to herein as "distillation" for purposes of brevity.

In my copending application Serial No. 114,889, filed December 9, 1936, for Distillation method and apparatus (of which the present case is a continuation in part), I have disclosed a method and apparatus wherein vapors evolved from a solution are compressed and brought into out-of-contact heat exchange relation with solution in the vaporization zone so that the energy of compression may be utilized in causing further solution to be evaporated and thereby maintain a continuous process. The present invention relates to apparatus of this type. This invention is particularly useful in connection with the improved apparatus of the type referred to which is shown and described in my said copending application and which is adapted for continuously distilling a solution while the apparatus is maintained substantially isolated from all external sources of heat or cold.

It is one of the purposes of this invention to provide improved means whereby a distillation operation may be instituted. While it is possible to institute distillation without resort to any extraneous source of heat, using the apparatus which is described in my said copending application, the improved apparatus herein described greatly facilitates the institution of a distillation operation. It is a feature of the present invention that gases and/or vapors which are compressed by the compression unit of the apparatus come wholly or partially into direct contact with the solution being distilled as distinguished from being brought into out-of-contact heat exchange with the solution. In this manner, heat generated by the compressor when the distillation operation is being instituted and carried by gases and/or vapors discharged from the compressor, is transmitted to solution in the vaporization zone so as to actively promote the generation of condensible vapors in this zone. Preferably, the heated gases and/or vapors are discharged adjacent the surface of the solution in the vaporization zone at the normal liquid level thereof. The gases and/or vapors preferably are discharged into the vaporization zone either just below the normal liquid level of the solution in the vaporization zone or just above the normal liquid level of the solution in the vaporization zone or at said normal liquid level. In any such case the hot gases and/or vapors cause the solution at the liquid level in the vaporization zone to become heated sufficiently so that condensible vapors can be withdrawn into the compressor instead of non-condensible gases such as air.

My invention is advantageous not only in that it facilitates the institution of the distillation operation, but also in that the gaseous material in the vapor space in the vaporization zone is prevented from becoming superheated due to the presence at all times of the vapor which is caused to be evolved from the solution in the vaporization zone and which saturates the gases in the vaporization zone until the non-condensible gases are discharged from the system. Likewise the danger of overheating the compressor is minimized according to this invention.

Figure 2:
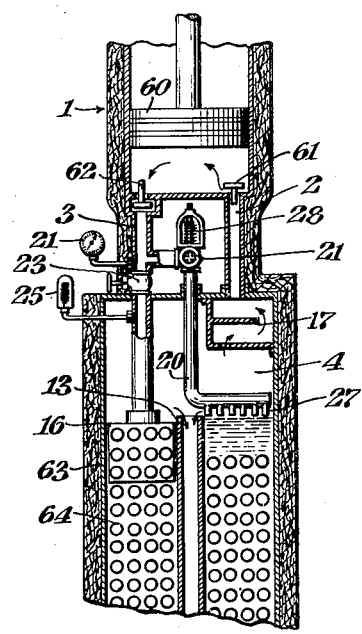

Further purposes, features and advantages of this invention will be apparent in connection with the following description of certain illustrative embodiments of this invention in connection with the accompanying drawing wherein Figure 1 is a side sectional view, partly diagrammatic, of one form of apparatus embodying this invention, which apparatus is suitable for separation of a volatile from a non-volatile component by simple distillation;

Figure 2 is a view similar to that shown in Figure 1 illustrating an alternate embodiment of my invention.

In Figure 1 there is shown a compressor indicated generally by the reference character 1, which is shown comprising a reciprocating piston 60 adapted to draw gas and/or vapor from the interior of vaporization chamber 4 through pipe 2 controlled by one-way valve 61 and discharge it at high pressure through pipe 3 controlled by one-way valve 62. The term "gaseous fluid" will be used herein with reference to either gases such as air or vapors such as water vapor or a mixture of gases and vapors. The compressor and the power means for driving the compressor are preferably designed to carry a somewhat greater load than the load that is carried during normal continuous operation of the apparatus. The vaporization chamber 4 may comprise the upper part of a cylindrical liquid and vapor-tight shell or tube indicated generally by the reference character 63 which has an opening at the top communicating with pipe 2 and an opening near or at the bottom communicating with pipe 9. Suitable baffles 17 may be provided to prevent any spray or foam from entering the compressor. The pipe 3 carrying the discharge from compressor 1 passes through the wall of the chamber 4 near or at the top and communicates with the upper end of the exchanger in chamber 4 which is indicated generally by the reference character 5 and which consists preferably of a header 16 (with which the pipe 3 is in direct communication) and coils 64 coiled about the central tube 12 in concentric layers alternately clockwise and counterclockwise, a plurality of such tubes preferably being arranged in parallel. The exchanger 5 is arranged to fill substantially all of the cross section of chamber 4 except the part occupied by the central tube 12, but is so wound that liquid can flow freely upwards through the interstices around the individual tubes of the coils.

A second exchanger 6 is arranged in shell 63 immediately below exchanger 5, and extends practically to the bottom of shell 63. The portion of the shell 63 occupied by exchanger 6 may be designated as the preheating chamber 68. The exchanger 6 may be composed of relatively few tubes or of tubes of smaller cross sectional area than the tubes of exchanger 5, so that they have a lesser total cross-sectional area of flow. In the form shown a single tube is employed in exchanger 6 which is wound in pancake coils, that is, in horizontal layers spiralling alternately outwardly from the center tube to the wall of chamber 68 and inwardly again. In this way the fluid flowing through the coil of exchanger 6 progresses from layer to layer continuously downward through the coil, while coming in contact with the entire cross-section of chamber 68, except the portion occupied by the center tube. The upper end of exchanger 6, adjacent to exchanger 5, is joined to and communicates with the lower end of exchanger 5 through a suitable header 7. The lower end of exchanger 6 terminates in pipe 8 which passes through the wall of shell 63, and from which the distillate is discharged. The exchanger 6 may be preferably arranged to take substantially the entire pressure drop from the discharge pressure of the compressor to atmospheric pressure since this will give high rates of heat transfer in a small space. The exchanger 5 may also be more or less reduced in section or number of tubes at the lower end as the vapor progressively condenses and the volume to be handled consequently decreases, but this is of only minor advantage, since pressure drop in this section should be kept low. In any event, it is necessary for practical efficiency, that the exchanger 6 shall be of relatively small cross section in comparison with the exchanger 5. In one good design for water, for example, the cross-sectional area of exchanger 6 is about one-twelfth of the cross-sectional area of the exchanger 5. This ratio will vary with the ratio of liquid to vapor density for the particular liquid in use and with the pressure developed by the compressor.

The convolutions comprising a coil of exchanger 6 may be suitably spaced to allow narrow uniform passages therebetween, through which liquid flowing through chamber 68 may pass, thereby coming in contact with all portions of the surface of the tubes.

A pipe 9, which may contain a filter 10 for removing solid material, such as dirt or scale, and a valve 11, communicates with the interior of vessel 63, at its lower end and near the point where pipe 8 emerges.

A tube 12 with the upper end or mouth 13 opening into chamber 4 at or near the top end of the exchanger 5, extends downward through the center of exchangers 5 and 6 and through the wall of chamber 68, to act as an overflow, discharging through valve 14 any liquid reaching point 13. When the apparatus is to operate at atmospheric pressure, valve 14 may be omitted. A suitable meter 30 adapted to indicate the rate of discharge of concentrated solution may be used, if desired.

The entire shell 63 except at its extreme lower end, the compressor 1, and the connecting pipes 2 and 3 are heavily insulated against heat losses by the covering 18, of any suitable heat insulating material such as magnesia, corrugated asbestos paper or mineral wool.

The apparatus described above is generally similar to the apparatus shown and described in my said copending application. The operation of the device involves the preheating of solution to be vaporized in the preheating zone afforded by heat exchanger 6 in which the heat of effluents from the system is dissipated as completely as possible to the incoming solution. The exchanger 5 constitutes a vaporization zone where the heat transfer is large, notwithstanding relatively small changes in temperature of the fluids. There is no exact line of demarcation between the preheating zone and the vaporization zone, inasmuch as this line may vary during the operation of the device in a way that constitutes a self-regulatory feature of the apparatus. The third element of the system is the compressor which supplies energy to the system for maintaining the distillation and which discharges vapor, the condensing temperature of which is higher than the boiling point of the concentrated solution in the vaporization zone. Further details as to the operation of the apparatus are described in my said copending application.

According to the present invention, a branch line 20 that is controlled by the valve 21 communicates with the compression side of the compressor. In the embodiment shown one end of the line 20 opens into the line 3. The mouth 22 at the other end of the branch line 20 terminates just below the normal liquid level of the solution in the vaporization chamber 4, this liquid level in the modification here described being determined by the position of the mouth 13 of the draw-off line 12. A throttle valve 23 is positioned in the line 3 at a point more removed from the compressor than the point in the line 3 at which the branch line 20 communicates with the line 3. For convenience in operating the apparatus a pressure gauge 24 communicates with the line 3 in the position shown. A thermometer 25 or other temperature recording device is adapted to indicate the temperature of gaseous fluid in the line 3.

In instituting a distillation operation using the device which has been described, the liquid to be distilled is introduced through the line 9 controlled by valve 11 into the casing 63. The liquid is permitted to rise in the casing until it commences to overflow at the mouth 13 of the draw-off line 12. The compressor is then started. The chamber 4 for the most part contains air and this air which is taken into the compressor and brought under compression becomes heated due to the energy imparted to it by the compressor. By partially or completely closing the throttle valve 23, this initial compression and heating of the air withdrawn from the vaporization chamber can be promoted. By opening the valve 21, which valve may be in some modifications of this invention a hand operated valve, the compressed and heated air is discharged back again into the vaporization chamber 4. Since the mouth of the branch line 20 terminates below the normal liquid level of solution in the vaporization chamber, the heated air causes vapors to be rapidly evolved from the surface of the solution. The evolved vapors soon saturate the air in the vaporization chamber and are withdrawn together with the air into the compressor. The air, which now is saturated with vapor, is again compressed and a mixture of the air and vapor can again be recycled into the vaporization zone so as to cause further vapor to be evolved. Upon partially opening the throttle valve 23, some of the mixture of compressed vapor and air can be caused to pass into the heat exchanger 5, wherein the vapor condenses and gives up its heat to the solution in the vaporization chamber so as to further promote the vaporization of the solution in this chamber. Non-condensible gases such as air will gradually be discharged from the system and the discharge from the compressor will become increasingly composed of the vapor distilled from the solution in the vaporization chamber. Eventually, the air or other uncondensible gas will be substantially completely discharged from the system. The valve 21 may be closed when sufficient vapor is being discharged from the compressor and condensed and cooled in heat exchangers 5 and 6 to maintain the distillation of the solution in the vaporization chamber 4. In the operation of the device the point when the valve 21 may be closed can be ascertained in different ways. For example, when the pressure falls to approximately the normal operating pressure for continuous distillation the valve 21 may be closed. The appearance of a substantial amount of condensate flowing from line 8 also is indicative of the fact that the valve 21 may be closed. After the valve 21 has been closed the distillation operation may be maintained continuously merely by continuing to operate the compressor. The maintenance of the distillation operation and features of heat exchange which are incident thereto are described more fully in my aforesaid copending application and need not be repeated here.

It is not essential to use a throttle valve 23. Distillation apparatus such as that shown in the accompanying drawing affords considerable resistance to the passage of air through the conduits of the heat exchangers 5 and 6. If the compressor is operated vigorously, the air is sufficiently compressed and heated so that the heated and compressed air will be discharged through the branch line 20 for the purpose of heating the solution in the vaporization chamber 4 and thereby accelerate the generation of condensible vapors. By the time the pressure in the apparatus has fallen due to gradual discharge of the air from the system, sufficient vapor will have been generated so as to permit the continued operation of the apparatus.

As mentioned hereinabove, the valve 21 may be manually operated. It is preferable, however, to have this valve operated automatically so that it will open when it is necessary to pass heated gases into the distillation chamber for the purpose of generating vapors therein. In Fig. 1 an arrangement for automatically operating the valve 21 is shown. The compressor 60 is operated from an electric motor 67, the electric motor being driven from any suitable source of electric current. Between wires 69 which are connected to the source of electric current and the motor 67 is an overload relay 70 which may be of any suitable type, of which many are well-known. In this modification the valve 21 is operatively connected with any suitable electrically-actuable valve-operating means 65. The valve-operating means 65 is connected by appropriate wiring 66 to the relay 70. Under normal load conditions the valve-operating means is not actuated from the relay 70 so as to permit gases and/or vapors to pass through the branch line 20 into direct contact with the solution in the vaporization chamber. However, when the motor 67 becomes overloaded, as in starting the distillation operation, the relay 70 causes the valve-operating means to open the valve 21 so as to permit gases and/or vapors to pass through the branch line 20 into direct contact with the solution in the vaporization chamber. When the overload falls off, then the relay causes the valve-operating means to result in the closing of the valve 21.

In Figure 2 an alternate embodiment of this invention is shown which is similar in all respects to the embodiment shown in Figure 1, with the exception that the draw-off line 20, instead of terminating below the normal liquid level of solution in the vaporization chamber, terminates at a point just above the surface of the solution. In order to cause the hot gases and/or air to be distributed over as much of the surface of the solution as possible, the branch line 20 may be provided with a plurality of discharge mouths 27.

In the modification shown in Figure 2, the valve 21, instead of being operated by an electrical valve-operating means, is of a relief valve type such as a valve which is normally maintained closed by a spring 28 that permits the valve to be opened whenever the pressure exceeds a predetermined amount. In the operation of the modification shown in Figure 2, the distillation is initiated by starting the operation of the compressor. As soon as the pressure in the discharge line 3 exceeds the pressure for which the relief valve 21 is set, the relief valve opens and permits the compressed and heated gaseous fluid to be discharged through the mouths 27 adjacent the surface of the liquid in the vaporization zone so as to cause vapors to be evolved from the liquid and drawn up into the compressor. As soon as the pressure on the system drops below the predetermined pressure at which the relief valve is set to operate, the relief valve closes and the apparatus operates in the usual way.

This invention is applicable in treating liquids such as sea water or other impure water for the recovery of distilled water or for the recovery of concentrated solutions, as the case may be, and is described in my said copending application in one of the specific examples of the practice thereof that is described therein. As mentioned in said application, the process and apparatus also are applicable in the distillation treatment of other liquids than water, where it is desired to recover the liquid free from dissolved materials contained therein. Moreover, it is applicable to the concentration of dilute solutions, such as brines, caustic solutions, sugar solutions, sap, wash water and the like from which it is desired to remove the water or other solvent and to recover valuable non-volatile materials or materials of lower volatility than the solvent. The present invention is applicable to operations of the type mentioned.

The institution of a typical distillation operation is described below for purposes of illustration.

The apparatus may be filled with sea water, for example, to the overflow level 13, and the compressor started. If the normal operation of the unit requires ½ H. P. and a pressure of 3 pounds per square inch in the discharge pipe 3, the valve 21 and its operating mechanism 65 may be adjusted to maintain a load of 1 H. P. on the motor, and the pressure in pipe 3 will be approximately 6 pounds. When first starting the apparatus, space 4, compressor 1, and pipes 2 and 3 are filled with air at atmosphere pressure. This air, being non-condensible, can pass only very slowly through the pipes 64 and 68 in exchangers 5 and 6. The compressor 1, which displaces a constant volume of gas and vapor per minute, tends to build up a high pressure in the discharge pipe 3 and header 16. As soon, however, as this pressure rises about 6 pounds the increasing load on the motor causes relay 70 to open valve 21 permitting part of the compressed vapor to escape from pipe 22, bubbling through the sea water at or near the surface. This compressed gas may be some 100° F. hotter than the gas entering through pipe 2, due to the energy of compression. If this gas at, say, 170° F. were immediately passed back into pipe 2 it would be again heated to a higher temperature yet. By passing it in contact with the cold sea water at point 22, the gas is partially cooled, and the water heated, while the gas is also caused to pick up enough vapor to saturate it. This operation continues with only a gradual rise in the temperature of the gases entering compressor through pipe 2. These gases also remain saturated with moisture. When the boiling point of sea water, 213° F. is reached, pure steam will enter the pipe 2, and being discharged through pipe 3 will condense in the heat exchanger 5. The pressure in pipe 3 then drops to about 3 pounds per square inch, and the load on the motor drops to the normal running load. This causes relay 70 to operate closing valve 21 and bringing about normal operating conditions.

If, during the starting operation, the air is forced out faster through the exchangers 5 and 6, than it is replaced by vapor, sufficient air will be drawn in through overflow pipe 13, valve 14 being open, to supply the deficiency. Or the space 4 may be operated under a partial vacuum, thereby speeding up the initiation of boiling, until sufficient vapor is generated to raise the pressure in space 4 to atmospheric.

In the operation of the modification shown in Figure 2, the relief valve spring 28 is set to open valve 21 at a pressure of 6 pounds and close it when the pressure falls below 6 lbs. The method of operation is identical otherwise with the last example.

If desired, apparatus embodying this invention may be operated under super- or sub-atmospheric pressure by appropriate control of the pressures at the inlet and outlets of the system.

While apparatus embodying this invention has been described in connection with a compressor which is of the piston type, it is apparent that other types of compressors such as compressors of the rotary vane or impeller type or of the centrifugal type may be employed. This invention is not limited to the type of distillation apparatus shown in Figs. 1 and 2. For example, my invention may be embodied with other types of distillation apparatus such as the other types of distillation apparatus shown in my aforesaid co-pending application. Moreover, this invention is of utility and advantage in any type of distillation apparatus wherein a gaseous fluid withdrawn from a vaporization zone is compressed and wherein the heat of compression is utilized in the distillation cycle.

I claim:

1. Distillation apparatus which comprises in combination a chamber adapted to contain a solution and a gaseous fluid above and in direct contact with said solution, a compressor adapted to compress a gaseous fluid, means arranged for directing gaseous fluid from the interior of said chamber into said compressor for compression therein, heat exchange means arranged to maintain a fluid in out-of-contact heat exchange with solution in said chamber, means for introducing fresh solution into said chamber, means for withdrawing concentrated solution from said chamber, means arranged for directing gaseous fluid compressed by said compressor into said heat exchange means in out-of-contact heat exchange with solution in said chamber, and a valve controlled line arranged to direct gaseous fluid from a point on the compression side of said compressor between said compressor and said heat exchange means into direct contact with solution in said chamber, the outlet of said line being adjacent the normal level of solution in said chamber.

2. Distillation apparatus which comprises in combination a chamber adapted to contain a solution and a gaseous fluid above and in direct contact with said solution, a compressor adapted to compress a gaseous fluid, means arranged for directing gaseous fluid from the interior of said chamber into said compressor for compression therein, heat exchange means arranged to maintain a fluid in out-of-contact heat exchange with solution in said chamber, means for introducing fresh solution into said chamber, means for withdrawing concentrated solution from said chamber, means arranged for directing gaseous fluid compressed by said compressor in out-of-contact heat exchange with solution in said chamber, said means including a throttle valve operable to obstruct the passage of gaseous fluid from said compressor to said heat exchange means, and a valve controlled line arranged to direct gaseous fluid from a point on the compression side of said compressor and on the compressor side of said throttle valve into direct contact with solution in said chamber, the outlet of said line being adjacent the normal level of solution in said chamber.

3. Distillation apparatus which comprises in combination a chamber adapted to contain a solution and a gaseous fluid above and in direct contact with said solution, a compressor adapted to compress a gaseous fluid, means arranged for directing gaseous fluid from the interior of said chamber into said compressor for compression therein, heat exchange means arranged to maintain a fluid in out-of-contact heat exchange with solution in said chamber, means arranged for directing gaseous fluid compressed by said compressor in out-of-contact heat exchange with solution in said chamber, means for introducing fresh solution into said chamber, means for withdrawing concentrated solution from said chamber, and a valve controlled line arranged to direct gaseous fluid from a point on the compression side of said compressor between said compressor and said heat exchange means into said chamber, the outlet of said line being adjacent and above said normal liquid level of solution in said chamber and arranged to direct gaseous fluid discharged from said line into contact with the surface of said solution.

4. Distillation apparatus which comprises in combination a chamber adapted to contain a solution and a gaseous fluid above and in direct contact with said solution, a compressor adapted to compress a gaseous fluid, means for directing a gaseous fluid from the interior of said chamber into said compressor for compression therein, heat exchange means arranged to maintain a fluid in out-of-contact heat exchange with solution in said chamber, means for directing gaseous fluid compressed by said compressor into said heat exchange means in out-of-contact heat exchange with solution in said chamber, means for introducing fresh solution into said chamber, means for withdrawing concentrated solution from said chamber, a line adapted to direct gaseous fluid from the compression side of said compressor into direct contact with solution in said chamber, a valve in said line operable to control the flow of gaseous fluid through said line, and valve-operating means arranged to operate said valve, said valve-operating means being actuatable responsive to pressure of gaseous fluid on the compression side of said compressor and being arranged to maintain said valve closed upon operation of said compressor for producing pressures on the compression side of said compressor below a predetermined pressure and to open said valve upon operation of said compressor for producing pressures on the compression side of said compressor substantially above said predetermined pressure.

5. Distillation apparatus which comprises in combination a chamber adapted to contain a solution and a gaseous fluid above and in direct contact with said solution, a compressor adapted to compress a gaseous fluid, means for directing a gaseous fluid from the interior of said chamber into said compressor for compression therein, heat exchange means arranged to maintain a fluid in out-of-contact heat exchange with solution in said chamber, means for directing gaseous fluid compressed by said compressor into said heat exchange means in out-of-contact heat exchange with solution in said chamber, means for introducing fresh solution into said chamber, means for withdrawing concentrated solution from said chamber, a line adapted to direct gaseous fluid from the compression side of said compressor into direct contact with solution in said chamber, and a relief valve in said line adapted to be normally closed except when the pressure produced by said compressor on the compression side thereof exceeds a predetermined amount.

6. Distillation apparatus which comprises in combination a chamber adapted to contain a solution, a compressor adapted to compress a gaseous fluid, means for directing a gaseous fluid from the interior of said chamber into said compressor for compression therein, heat exchange means arranged to maintain a fluid in out-of-contact heat exchange with solution in said chamber, means for directing gaseous fluid compressed by said compressor into said heat exchange means in out-of-contact heat exchange with solution in said chamber, means for introducing fresh solution into said chamber, means for withdrawing concentrated solution from said chamber, a line adapted to direct gaseous fluid from the compression side of said compressor into direct contact with solution in said chamber, a valve in said line operable to control the flow of gaseous fluid through said line, and valve operating means arranged to operate said valve, said valve operating means being adapted to maintain said valve closed when said compressor is under a predetermined load and being responsive to an overload on said compressor to open said valve.

7. A method of instituting and maintaining distillation which comprises introducing a solution at a temperature below its boiling point into a vaporization chamber containing air above the level of solution in said chamber, withdrawing said air from said chamber, compressing said withdrawn air and thereby substantially increasing the temperature thereof, directing the air after compression thereof and while at said elevated temperature so as to initially contact directly said solution in said chamber adjacent the surface thereof, thereby increasing the temperature of the air in said chamber, increasing the temperature of said solution in said chamber adjacent the surface thereof to its boiling point, and increasing the proportion of vapor in said air in said chamber, withdrawing air containing the vapor from the vaporization chamber and compressing it and directing the compressed air containing vapor into out-of-contact heat exchange with solution in said chamber and thence out of the system, gradually discharging the air from the system together with vapor directed as aforesaid in out-of-contact heat exchange with solution in the vaporization chamber and finally discontinuing to direct any air or vapor so as to directly contact solution in said chamber while continuing to maintain distillation in said chamber, concentrated solution being withdrawn from said chamber while said distillation is maintained.

8. A method of instituting and maintaining distillation which comprises introducing a solution into a vaporization zone, withdrawing gaseous fluid from said vaporization zone, compressing the withdrawn gaseous fluid and thereby increasing the temperature thereof, directing the gaseous fluid after compression thereof into direct contact with solution in said vaporization zone until the proportion of vapor in said zone is increased and until the temperature in said zone is increased, continuing to withdraw gaseous fluid containing said vapor from said zone and to compress it after the withdrawal thereof, then directing the compressed gaseous fluid containing vapor into out-of-contact heat exchange with solution in said vaporization zone and discontinuing to direct the compressed gaseous fluid into direct contact with solution in said vaporization zone while continuing to maintain distillation of solution in said zone, concentrated solution being withdrawn from said zone while distillation is maintained.

ROBERT V. KLEINSCHMIDT.